Oct. 30, 1956    R. J. GAUBERT ET AL    2,768,673
MACHINE FOR FORMING BAGS
Filed Aug. 14, 1953    6 Sheets-Sheet 3

INVENTORS
RENE J. GAUBERT
DONALD E. PRENVEILLE
BY Hans G. Hoffmeister
ATTORNEY

FIG_10

FIG_11

INVENTORS
RENE J. GAUBERT
DONALD E. PRENVEILLE
ATTORNEY

Oct. 30, 1956  R. J. GAUBERT ET AL  2,768,673
MACHINE FOR FORMING BAGS

Filed Aug. 14, 1953  6 Sheets-Sheet 6

INVENTORS
RENE J. GAUBERT
DONALD E. PRENVEILLE
BY Hans G. Hoffmeister
ATTORNEY

United States Patent Office 2,768,673
Patented Oct. 30, 1956

2,768,673

MACHINE FOR FORMING BAGS

Rene J. Gaubert and Donald E. Prenveille, Oakland, Calif., assignors to Food Machinery and Chemical Corporation, San Jose, Calif., a corporation of Delaware Application August 14, 1953, Serial No. 374,266

10 Claims. (Cl. 154—42)

This invention relates to improvements in machines for forming bags from tubular material. More particularly it relates to a machine for consecutively forming tubular bags, sealed at one end, from a continuous tube of heat-sealable plastic material, such as polyethylene.

An object of the present invention is the provision of a novel mechanism for applying a heat seal to a plastic material.

Many plastic materials from which bags are formed will deform or stretch if a tension is applied to the material as a heat seal is being formed. It is, therefore, another object of this invention to provide a machine in which a heat seal may be made across a plastic tube while the tube is being advanced, without exerting any tension on the adjacent portions of the tube.

Another object of this invention is, therefore, the provision of an improved mechanism for obtaining a substantially tensionless progression of a plastic film through a bag forming machine.

Another object is the provision of an improved cutter for shearing the tubular strip of plastic material into predetermined lengths.

Other and further objects and advantages of the present invention will become apparent to one skilled in the art from the following description taken in connection with the accompanying drawings in which.

Figure 1:
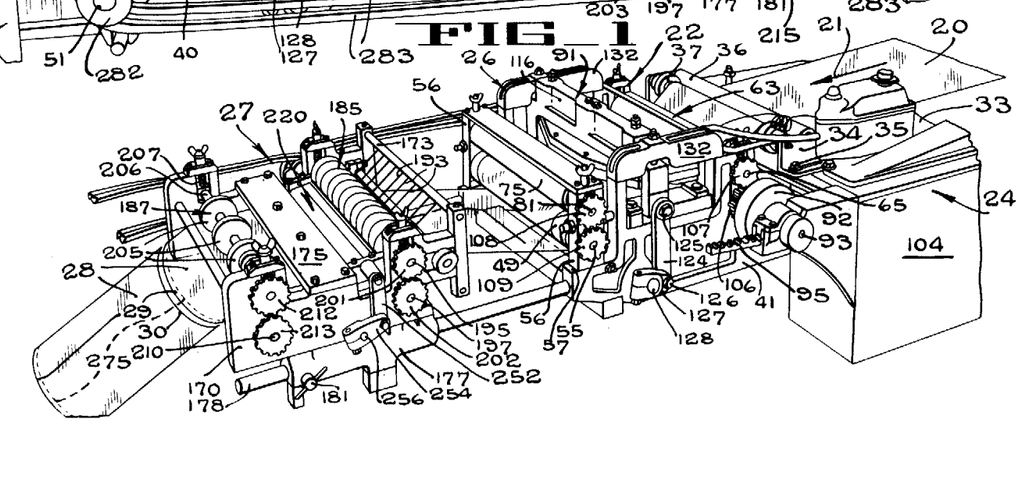
Fig. 1 is a perspective of a bag forming and sealing machine constructed in accordance with the teachings of the present invention.

In Fig. 1, the reference numeral 20 indicates a tubular film of heat sealable plastic material, such as polyethylene, which is drawn from a suitable supply roll (not shown) and moved, in the direction indicated by arrow 21, into the feed end 22 of the bag forming and sealing machine which is generally indicated by the reference numeral 24. The film 20 passes over various feeding and idler rollers, to be described hereinafter, through a heat-sealing section 26, then through a cutting section 27 to be finally discharged in the form of a plurality of tubular bags 28, each bag having a curved, sealed leading edge 29 and a curved, unsealed trailing edge 30.

Figure 2:
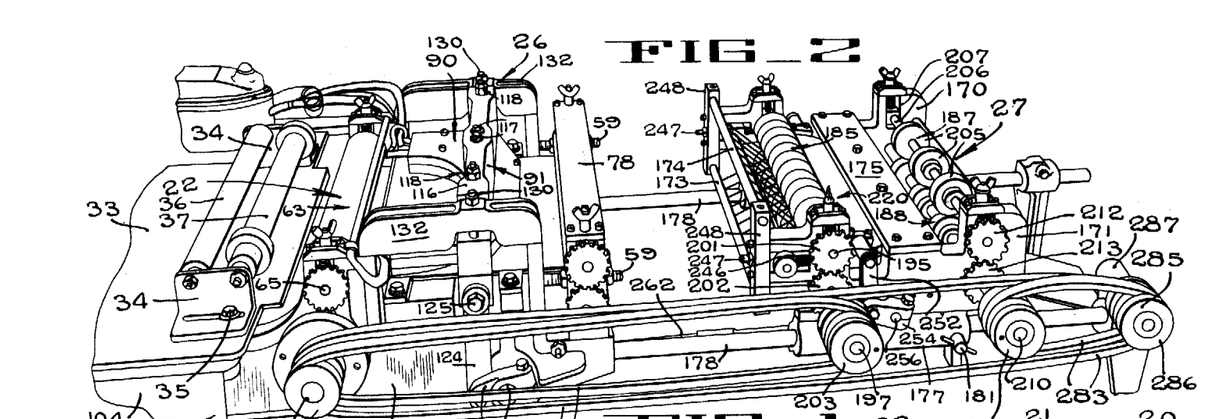
Fig. 2 is a perspective showing the side of the machine opposite to that shown in Fig. 1.
Figure 6:
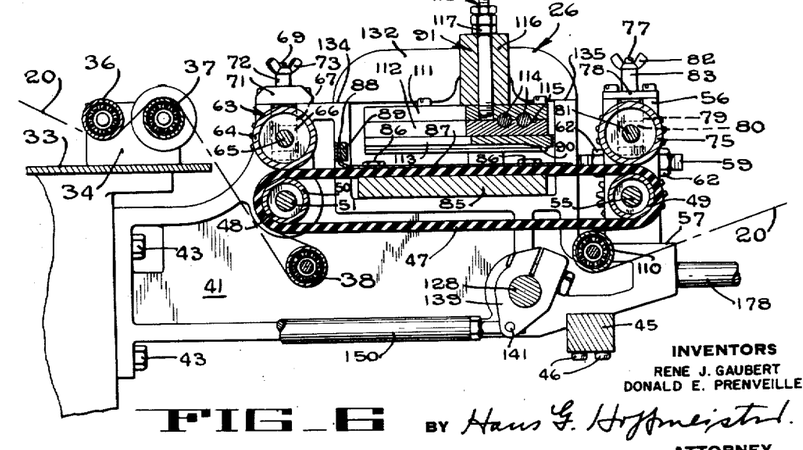
Fig. 6 is a vertical section taken along line 6—6 of Fig. 5.
Figure 7:
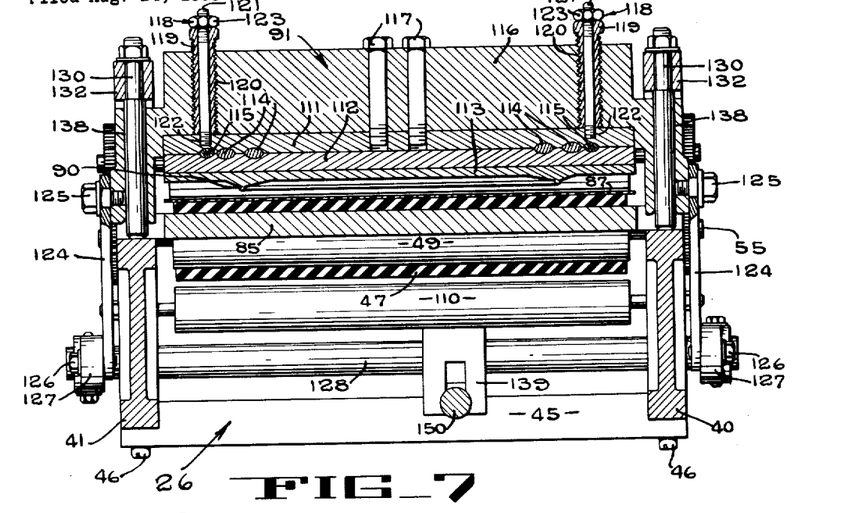
Fig. 7 is a vertical section taken along line 7—7 of Fig. 5.

Referring to Fig. 2, which is a view of the side of the machine opposite to that shown in Fig. 1, it will be seen that the feed end 22 includes a table 33 supported at a desirable elevation on suitable standards (not shown). A pair of transversely spaced brackets 34, adjustably secured by bolts 35 to the surface of the table, cooperate to rotatably journal guide rollers 36 and 37. As seen in Fig. 6, the tubular film 20 passes under roller 36, over roller 37, and then under an idler roller 38 which is rotatably journalled in transversely spaced brackets 40 and 41 (Figs. 6 and 7). Each of the brackets 40 and 41 is secured by bolts 43 to the forward face of the table structure 33. To rigidify the structure, a cross brace 45 (Fig. 6) is secured by capscrews 46 to the undersurface of each of the brackets 40 and 41.

Figure 5:
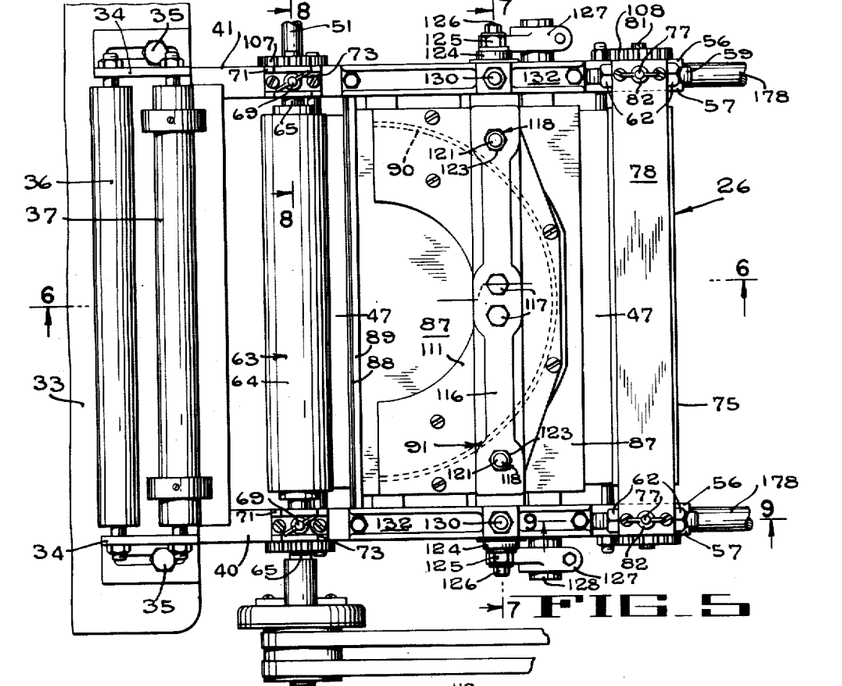
Fig. 5 is a fragmentary plan of the intake or heat-sealing end of the machine.
Figure 8:
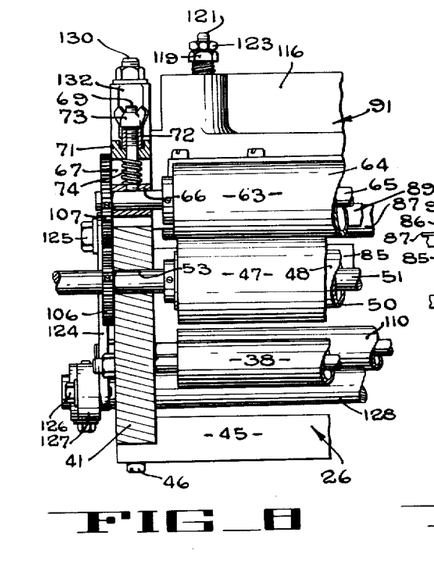
Fig. 8 is a vertical section taken on line 8—8 of Fig. 5.
Figure 9:
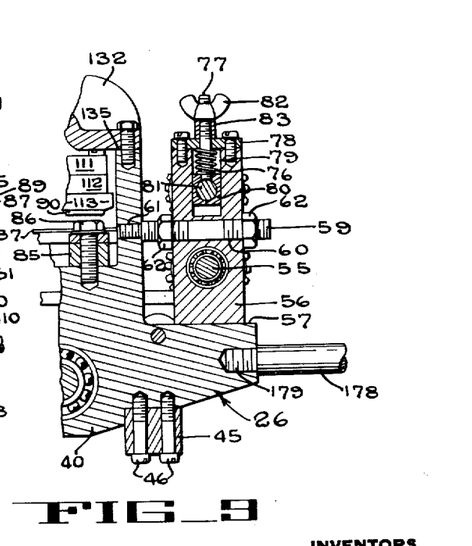
Fig. 9 is a vertical section taken along line 9—9 of Fig. 5.

The film 20 is carried through the sealing section 26 on a rubber belt 47 which is trained around a drive roller 48 and a driven roller 49. The drive roller 48 has a tubular belt-contacting portion 50 mounted, as by spiders (not shown) on a drive shaft 51 (Fig. 8) which is journalled for rotation in openings 53 in the brackets 40 and 41. The belt 47 is frictionally driven by drive roller 48 and, in turn, frictionally drives roller 49 which has a central shaft 55 (Fig. 6) rotatably journalled in spaced upstanding posts 56 (Fig. 5). Each post 56 is disposed on the flat upper surface of a shelf 57 extending forwardly at the forward end of each of the brackets 40 and 41. Each post 56 is secured to its associated bracket by a stud 59 (Fig. 9) which passes freely through a longitudinal opening 60 in the post and is threaded into a tapped hole 61 in the forward face of the bracket. Lock nuts 62 are threaded on the stud 59 on each side of the post 56 to lock the post in adjusted position on the bracket. A roller 63 (Fig. 6) is disposed in vertical alignment with the drive roller 48 and has a tubular belt-contacting portion 64 supported on a central shaft 65 which is rotatably journalled near each end in a block 66 mounted for vertical sliding movement in a vertical slot 67 (Figs. 6 and 8) in one of the brackets 40 or 41. Each block 66 is suspended in the slot 67 by a stud 69 which has a lower end threaded in the block 66 and an upper end which passes through an opening in a cap 71 (Fig. 6) that is secured to the upper surface of the bracket, bridging the upper end of the slot. A collar 72 (Fig. 8) is disposed around the upper end of the stud and is pressed against the cap 71 by a wing nut 73 threaded on the upper end of the stud. A coil spring 74, disposed around the stud 69 between the block 66 and the cap 71, urges the block into its lowermost position. Thus, by means of the wing nuts 73 at each side of the roller 64, the pressure of the roller 64, on the rubber belt 47 may be varied. At the forward end of the belt 47, a second roller 75 (Fig. 6) extends transversely of the machine directly above the roller 49. The roller 75 is resiliently urged against the belt by a coil spring 76 (Fig. 9) disposed around a stud 77 between a cap plate 78 which bridges a slot 79 in the post 56 and a sliding block 80 in which the drive shaft 81 of the roller 75 is rotatably journalled. A wing nut 82, threaded on the upper end of each stud 77, presses a collar 83 against the cap 78. The wing nuts 82 at each end of the roller 75 are used to vary the pressure of the roller 75 against the belt 47.

The rubber belt 47, on which the film 20 is carried as it passes through the sealing section 26, is supported intermediate its length by a plate 85 (Fig. 6) that is secured at each end to the spaced brackets 40 and 41, by capscrews 86. Disposed over the belt 47 is a sheet 87 of heat resistant plastic material, such as tetrafluoroethylene, commercially known as "Teflon." This sheet is approximately as wide as the belt and has a rearward edge 88 retained between clamping straps 89 which extend transversely between the brackets 40 and 41. The plastic sheet 87 extends to a point adjacent the forward edge of the belt and lies between the film 20 and the heat applying element 90 of a vertically movable sealing head 91 for a purpose which will be explained presently.

Figures 3, 4:
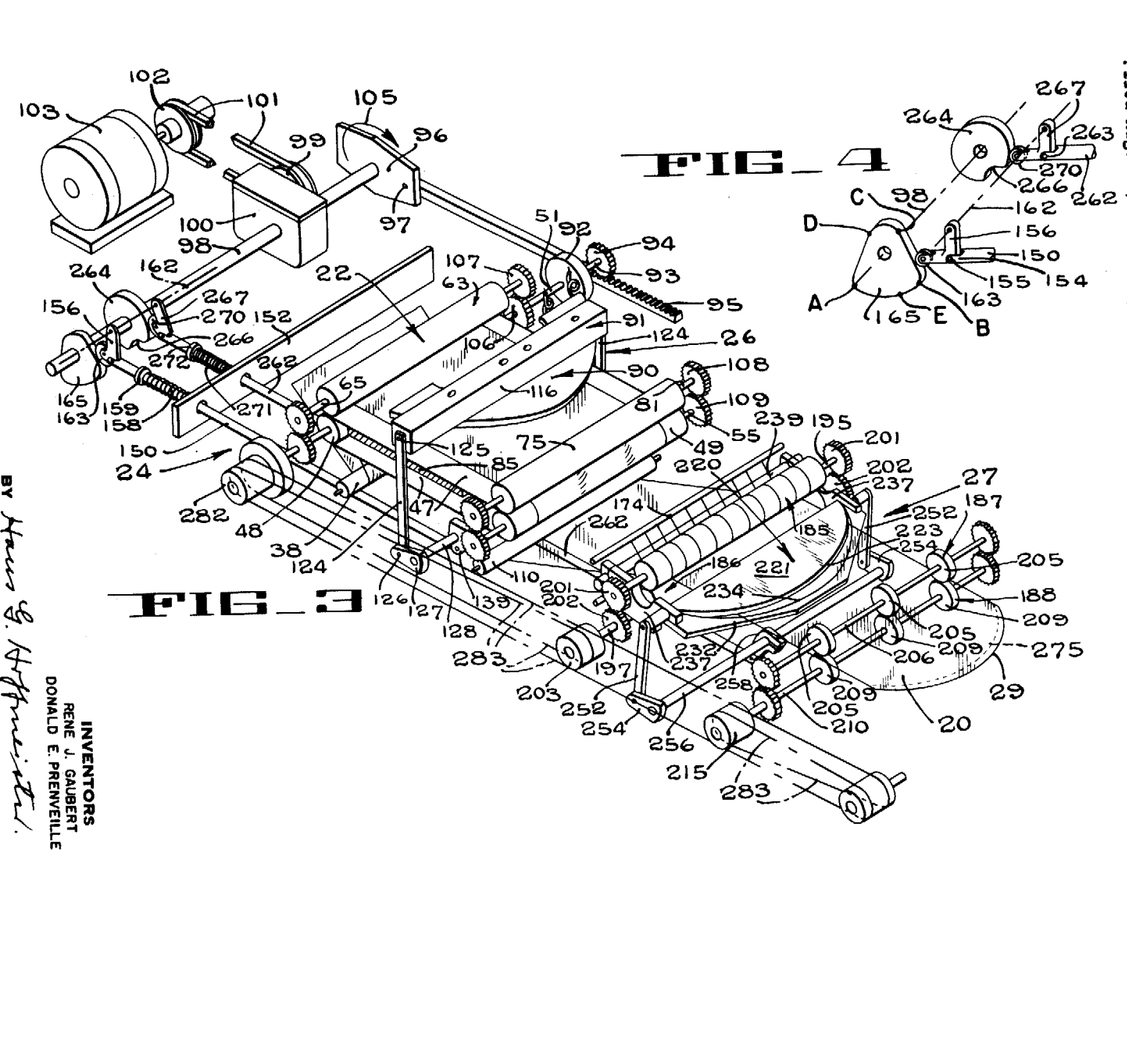
Fig. 3 is a fragmentary diagrammatic perspective of the machine of Fig. 1, particularly showing the drive mechanism.
Fig. 4 is an enlarged diagrammatic perspective of a portion of Fig. 3.

With reference to Fig. 3, the drive roller 48 is intermittently driven in one direction by means of an over-running clutch 92, of conventional design. The roller shaft 51 is the driven shaft of the clutch 92 which also has a drive shaft 93 which carries a pinion 94. A rack 95 which is in mesh with the pinion 94 is reciprocated through a crank 96 which is pivotally connected, as at 97, to the rack 94 and is keyed to a shaft 98 which extends through a gear box 100. Inside the gear box the shaft 98 is operatively connected to a shaft (not shown) which extends through the gear box casing and carries a sheave 99 in keyed relation thereon. A V-belt 101 is trained around the sheave 99 and around a sheave 102 which is keyed to the power shaft of a motor 103. The motor 103, the V-belt drive, the gear box 100, and the shaft 98 may be supported in any suitable manner from the frame of the machine and, as seen in Fig. 1, the entire mechanism may be disposed at the feed end of the machine, partially enclosed by a housing 104.

When the motor 103 is put into operation, the shaft 98 and the crank 96 are driven in a clockwise direction as indicated by the reference arrow 105 in Fig. 3. As the pivotal connection 97 moves rearwardly, the rack 95 is drawn rearward, rotating the pinion 94 in a clockwise direction. The over-running clutch 92 is so arranged that clockwise rotation of the pinion 94 and the shaft 93 effects rotation of the roller shaft 51 in a clockwise direction, while counterclockwise rotation of the pinion 94, as a result of forward movement of the rack 95, causes no movement of the roller shaft 51. A gear 106 (Fig. 3) is keyed to the roller shaft 51 and is in mesh with a gear 107 which is keyed to the shaft 65 of the roller 63. A gear 108 is keyed to the roller shaft 81 of the roller 75 and is in mesh with a gear 109 which is keyed to the shaft 55 oft he roller 49. The gears 106, 107, 108 and 109 are identical in respect to size and number of teeth. If desired, similar gears may be keyed on the opposite ends of the shafts 51, 65, 55 and 81.

Referring to Fig. 6, it will be seen that clockwise rotation of the shaft 51, as a result of rearward movement of the rack 95, causes frictional drive of the belt 47 which, in turn, frictionally drives the roller 49 and the roller shaft 55. Through the geared connections, the rollers 63 and 75 will be positively rotated at the same speed as the rollers 48 and 49. Since all four rollers have the same angular velocity, and since the outer diameter of the rollers 63 and 75 is equal to the effective outer diameter of the belt as it moves around the rollers 48 and 49, it is evident that the linear velocity of the surfaces of the rollers 63 and 75 is the same as the linear velocity of the belt. Thus, the film 20 will be fed into the space under the sealing head, by the cooperation of the roller 63 with the belt 47, at the same velocity with which it is withdrawn from said space by the roller 75 and the belt 47. Thus, there is substantially no tension on the film during the time it travels through the space under the sealing head.

After leaving the forward end of the belt 47, the film is trained around a second idler roller 110 rotatably journalled in the frame of the machine. It will be noted in Fig. 6 that the idler roller 38 is disposed forwardly of the rear end of the belt 47 and the idler roller 110 is disposed rearwardly of the forward end of the belt 47. With this arrangement approximately 180° of frictional contact is obtained between each end of the belt and the film. Since all parts of the belt move at the same linear speed, the rear edge of the belt frictionally feeds the film toward the sealing head at the same speed with which it is withdrawn by the forward edge of the belt. The film will be maintained in the tensionless condition for a predetermined time until it reaches the idler roll 110. About the time the film has reached the forward end of the belt, the heat seal has cooled and the film can thereafter be tensioned with no adverse effects.

The sealing head 91 is best shown in Figs. 5, 6, and 7 and comprises three superposed plates 111, 112 and 113 all suitably secured together, as by capscrews. The lowermost plate 113 carries the heat applying bead 90 which, as seen in Fig. 5, has a curved, circular configuration. A heating element 114 and a temperature control member 115 are disposed between the plates in a well known manner. The plates 111, 112, and 113 are suspended above the belt 47 on a vertically movable mounting bar 116 by means of bolts 117 which secure the central portion of the plate 111 to the bar, and adjjustable bolts 118 which draw the outer portions of the plate to the bar. Each adjustable bolt 118 includes an outer tubular member 119, threaded into a tapped opening 120 in the bar 116, and a stud 121 which extends through the tubular member 119 and has a lower end threaded into a tapped opening 122 in the plate 111 and a threaded upper end extending through the tubular member 119 to receive a nut 123. If the outer portions of the plates 110, 111, and 112 warp due to heat concentrations, the bolts 118 may be adjusted to remove the warped condition and bring the curved sealing bead 90 into a flat horizontal plane.

The mounting bar 116 and the attached sealing head are moved vertically by means of push rods 124 (Figs. 3 and 7) one of which is pivotally connected to each side of the mounting bar 116 by a capscrew 125. The lower end of each push rod 124 is pivotally connected, at 126 to a crank arm 127 (Fig. 3) which is keyed to a transverse shaft 128 journalled for rotation in the frame of the machine. As the shaft 128 is oscillated through a fixed angular range, each push rod 124 is moved up and down to raise and lower the sealing head. The mounting bar 116 is guided during this vertical reciprocation by means of guide rods 130 (Fig. 7) one of which is disposed at each end of the bar 116 in fixed position extending downwardly from a support member 132 (Fig. 2) that bridges the gap between two longitudinally spaced platforms 134 and 135 (Fig. 6) formed integrally on each bracket 40 and 41. The guide rods 130 are received in sliding relation in vertical apertures 138 (Fig. 7) in the mounting bar 116.

The transverse shaft 128, which controls the raising and lowering of the sealing head 91, is oscillated by means of an actuating arm 139 (Figs. 3, 6 and 7) which is clamped rigidly on the shaft 128 and pivotally connected by a pin 141 (Fig. 6) to a push rod 150. The push rod 150 extends rearwardly from the actuating arm 139, through a fixed frame member 152 (Fig. 3) and has a yoke-type end 154 (Fig. 4) pivotally connected at 155 to a cam follower arm 156. A coil spring 158 (Fig. 3) disposed between the frame member 152 and a collar 159 secured to the push rod 150, urges the push rod toward the left, as seen in Fig. 3, and tends to rotate the actuating arm 139 and the shaft 128 in a clockwise direction. The cam follower arm 156 is pivotally mounted on a rod indicated by the dot-dash line 162. A roller 163 is rotatably mounted on the follower arm 156 and is arranged to ride on the camming surface of a cam 165 which is keyed to the shaft 98. The camming surface is so designed that during each revolution of the shaft 98, the push rod 150 is positively moved toward the right and then returned to the left by the spring 158. For this purpose the cam 165 has a rise extending in a counterclockwise direction (Fig. 4) from point A to B and a depression extending from C to D with suitable transition surfaces between the rise and the depression. In Fig. 3, the approximate relationship of the movements of the rack 95 and the push rod 150 is illustrated. It will be noted that the pivot point 97 is just starting its downward, rearward movement, and the rack 95 is beginning to move rearwardly, starting the forward feeding movement of the film 20. At this point the roller follower 163 is beginning to ride down onto the depression of the cam, causing the push rod 150 to be moved to the left and the sealing head to be raised. For 180° of rotation of the shaft 98 the sealing head will be in raised position while the film 20 is being advanced due to the rearward movement of the rack 95. When the rack 95 starts forward, the clutch 92 overruns and the forward movement of the film is stopped during the second 180° of rotation of the shaft 98. At the start of the second 180°, the roller 163 climbs the rise of the camming surface, the push rod 150 is moved to the right and the sealing head is lowered to form a heat seal on the stationary film 20 disposed on the belt 47.

It is to be particularly noted that the sealing bead 90 presses the film 20 down against the resilient rubber belt 47 during the sealing operation. The top surface of the support plate 85 (Fig. 6) is at a level that causes the belt 47 and the film 20 to be slightly raised under the sealing head to attain an improved film contact during sealing. With this arrangement, a particularly effective seal is obtained.

The cutting section 27 has a support structure comprising two longitudinally extending, transversely spaced brackets 170 and 171 (Figs. 1 and 2) rigidly connected by a pair of rear support rods 173 and 174 and a connector plate 175. A longitudinal guide tube 177 (Figs. 1 and 2) is secured to the under surface of each of the brackets 170 and 171. At each side of the machine, a rod 178 extends longitudinally of the machine and has a rearward end portion 179 (Fig. 9) threaded into a tapped opening in the sealing section brackets 40 and 41 and a forward end portion slidably disposed in the guide tube 177. A setscrew 181 (Fig. 2) is threaded through each guide tube 177 and bears against the rod 178 to lock the rod 178 relative to the guide 177, thus locking the cutting section of the machine in a fixed position relative to the sealing section. When the setscrews 181 are loosened, the cutting section can be shifted on the rods 178 to adjust its position.

Referring to Fig. 3, it will be seen that after the film 20 passes between the roller 75 and the forward end of the belt 47, it is directed downwardly and rearwardly around an idler roller 110 rotatably journalled in the frame of the machine. The film 20 is then guided upwardly and forwardly and is threaded between a pair of rear rollers 185 and 186 and between a pair of forward roller assemblies 187 and 188. The roller 185 has a tubular body portion 190 (Fig. 11) which has a plurality of laterally spaced annular grooves 191 (Fig. 10) adapted to receive spring guide fingers 193. The fingers 193 have rearward ends anchored in the cross bar 174 and forward ends extending into the grooves 191 on the underside of the roller 185. The tubular body portion 190 of the roller 185 is carried on a central shaft 195 which is resiliently mounted at each side in a vertical slot 196 in the brackets 170 and 171 in the manner explained in connection with shaft 81 of roller 75, illustrated in Fig. 9. The lower roller 186 (Fig. 11) has a central shaft 197 rotatably journalled near each end in the brackets 170 and 171. The roller 186 has a tubular film-contacting body portion 198 provided with a plurality of laterally spaced annular grooves 199 corresponding in number, size and location with the grooves 191 of the upper roller 185. Spring guide fingers 200 have rearward ends suitably anchored in the cross bar 173 and forward ends extending into the grooves 199 on the upper side of the body portion 198 of the roller 186. The opposed spring fingers 191 and 200 cooperate to guide the film 20 into position between the rolls 185 and 186 which are resiliently pressed together to pull the film 20 forwardly therethrough. The shafts 195 and 197 have meshing gears 201 and 202 (Fig. 3), respectively, keyed thereon. A grooved pulley 203 is also keyed to the shaft 197 outwardly of the gear 202. When the pulley 203 is rotated, in a manner to be described hereinafter, the shafts 195 and 197 are rotated at the same speed to draw the film 20 forwardly.

The forward upper roller assembly 187 comprises three rollers 205 of equal diameter keyed in laterally spaced relation on a shaft 206 which is resiliently journalled for rotation in slots 207 (Fig. 11) in the brackets 170 and 171, in the same manner as shaft 195 of roller 185. The lower roller assembly 188 comprises three rollers 209 having diameters equal to the diameters of rollers 205 and arranged in laterally spaced, keyed relation on a shaft 210 directly below the rollers 205, as shown in Fig. 3. The shafts 206 and 210 carry meshing gears 212 and 213, respectively, and a pulley 215 is keyed on the shaft 210 outwardly of the gear 213. When the pulley 215 is rotated the rollers 205 and 209 move the film 20, which is resiliently pressed therebetween, forwardly for discharge into a suitable receiving device (not shown).

Figure 10:
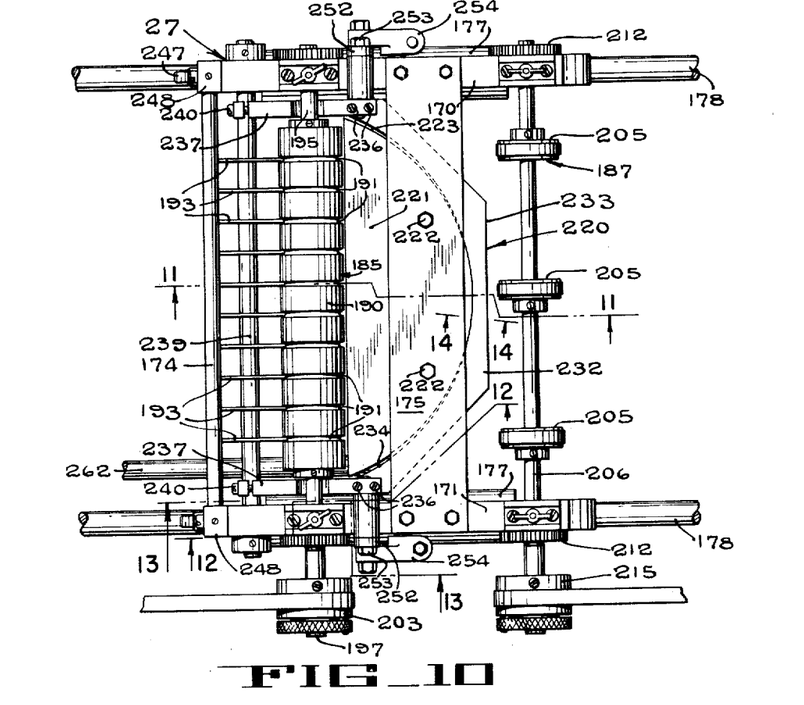
Fig. 10 is a plan of the discharge or tube-cutting end of the machine of Fig. 1.
Figure 11:
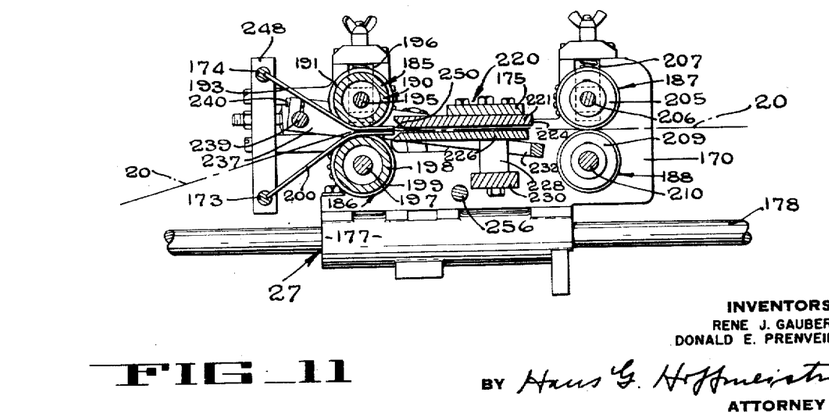
Fig. 11 is a vertical section taken on line 11—11 of Fig. 10.

A knife assembly 220 (Fig. 3) is mounted between the rear rollers 185, 186 and the forward roller assemblies 187, 188. The knife assembly comprises an upper stationary plate 221 (Figs. 10 and 11) which is secured to the under surface of the transverse connector plate 175 by capscrews 222. As seen in Fig. 10, the stationary plate 221 has an arcuate forward edge 223 and, as seen in Fig. 11, this edge 223 has depth to provide an upright shearing face 224. A lower stationary support plate 226 (Fig. 11) is disposed in spaced relation below the plate 221 to define a passage through which the film 20 is threaded. The support plate 226 is mounted on a pedestal 228 extending upwardly from a bar 230 that is rigidly secured between the brackets 170 and 171. A lower cutting blade 232 (Figs. 10 and 11) of generally U-shaped configuration is mounted for upward swinging movement. The base end 233 of the U provides a concave cutting edge 234 that is formed on a slightly larger radius than the edge 223 of the stationary plate 221 with which it cooperates to shear the film 20. At its side the U-shaped blade 232 is secured by capscrews 236 (Fig. 10) to arms 237 that are clamped to a transverse bar 239 by setscrews 240. The bar 239 is rotatably journalled at its ends in blocks 242 and 243 (Figs. 12 and 13) which are slidably disposed respectively in a slot 244 (Fig. 13) of the bracket 170 and a slot 245 (Fig. 12) of bracket 171. A spring 246 (Fig. 12) is positioned between each bracket and its associated block to urge the block rearwardly against a stop member 247, threaded in a vertical limit bar 248 connected to the bracket.

When the cutting blade 232 is pivoted upwardly, a shearing action is produced which progresses from the sides of the film 20 toward its center since the blades move into cutting relation first at a point adjacent their marginal edge and outside the marginal edges of the film. Both the stationary upper blade 221 and the swinging lower blade have flat forward faces, but due to the swinging action of the lower blade, a shearing action takes place. The springs 246 permit movement of the lower knife assembly 232 in a longitudinal direction. Further, as shown in Fig. 11, the upper and lower blades always have a slight overlap, as at 250, to insure that they will always be engaged for proper shearing action. While the radii of the upper and lower blades are slightly different, the blades are so proportioned that the radius of the cut is substantially the same as the radius of the seal.

Figure 12:
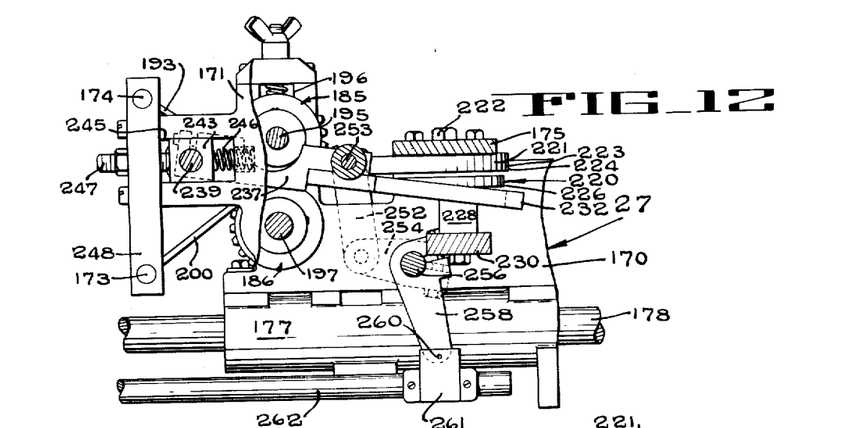
Fig. 12 is a vertical section taken on line 12—12 of Fig. 10.
Figure 13:
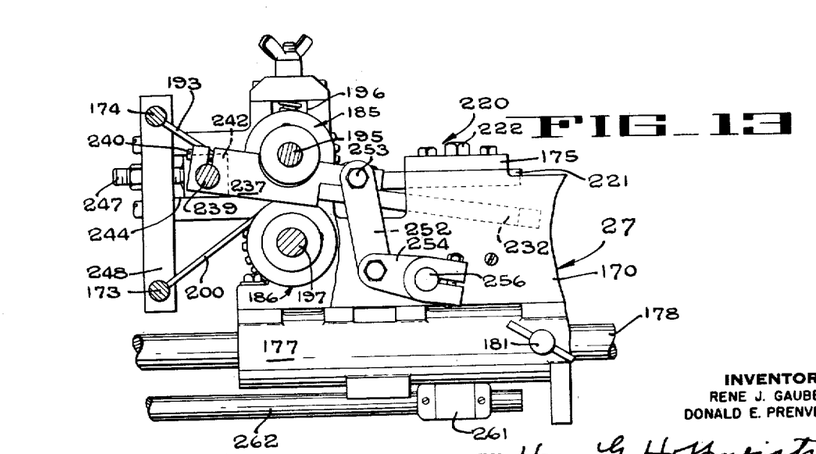
Fig. 13 is a vertical section taken on line 13—13 of Fig. 10.
Figure 14:
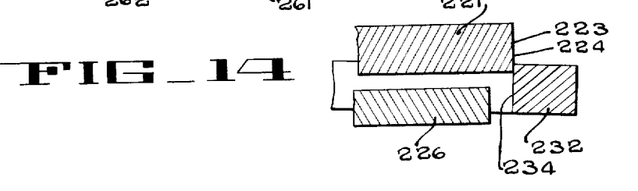
Fig. 14 is a vertical section taken on line 14—14 of Fig. 10.

Pivoting movement of the lower cutting blade 232 is effected by means of push rods 252 (Figs. 3 and 13) one of which is pivotally connected to each side of the blade 232 through a pin 253 which passes freely through an opening at the upper end of the push rod and has an end portion clamped in the blade mounting arm 237. At its lower end, each push rod 252 is pivotally connected to an arm 254 which is keyed to a shaft 256 journalled in the brackets 170 and 171 and extending transversely of the machine below the cutting section. An actuating arm 258 (Figs. 3 and 12) is clamped on the shaft 256 intermediate its ends and is pivotally connected at 260 (Fig. 12) to a collar 261 secured to a push rod 262, which extends longitudinally of the machine. In Fig. 12 it will be noted that movement of the push rod 262 to the left will cause clockwise rotation of the shaft 256 and upward pivoting movement of the lower blade 232. Movement of the push rod 262 to the right on the other hand causes counterclockwise movement of the shaft 256 and downward, lowering movement of the lower knife blade 232. The reciprocating movement of the push rod 262 is controlled by a cam 264 (Fig. 3) keyed to the constantly rotating shaft 98. The cam 264 has a camming surface that is uniform for a major portion of its periphery but is provided with a short recess 266 (Fig. 4). A cam follower arm 267, pivotally mounted on the shaft 162, is pivotally connected to the push rod 262 by a pin 263 and rotatably supports a roller 270 which rides along the edge of the cam 264. The roller 270 is pressed against the cam by a coil spring 271 (Fig. 3) disposed between the frame member 152 and a collar 272 secured to the push rod 262. When the roller 270 is in the position indicated in Fig. 4, the knife blade 232 is in its lower position (Fig. 12). As the cam 264 rotates counterclockwise, the push rod 262 is not reciprocated until the roller 270 drops into the recess 266 permitting the coil spring 271 to force the push rod to the left which is effective to raise the knife blade 232 and cut the film. Comparing the positions of the cams 165 and 264 on Fig. 4, it will be seen that at the time the roller moves into the recess 266, the roller 163 will be approximately at point E on the rise of cam 165. Thus the cutting stroke is made while the film is stationary and the sealing head is in lowered, heat-applying position. As previously explained the cutting section of the machine may be adjusted bodily on the side rods 178 relative to the sealing section. With this arrangement the cutting blades can be positioned so that the film 20 will be cut immediately in front of the curved seal which has been previously formed. In Fig. 1 the dotted line 275 indicates the seal formed on the film and the forward edge 29 of the bag indicates the curved cut made by the knife assembly.

With reference again to Fig. 3 the drive shaft 51, which is intermittently rotated by the reciprocating rack 95 through the overrunning clutch 92, carries a double-grooved pulley 282 at one end. A continuous V-belt 283 is disposed in the outer groove of the pulley 282 and extends forwardly from the top side thereof to be positioned in a groove in the pulley 203 keyed to the shaft 197 of the roller 186. After passing around the pulley 203, the belt 283 returns to the inner groove of the pulley 282 and then forwardly into an inner groove in an idler pulley 285 keyed to a shaft 286 that is journalled in a bearing 287 (Fig. 2) adjustably mounted on the forward end of the side rod 178 on the drive side of the machine. After passing around the idler pulley 285, the belt is disposed in a groove in the pulley 215 keyed to the shaft 210 of the lower roller assembly 188 and is then again trained around the idler pulley 285. After passing around the idler pulley 285 the second time, the belt 283 is returned to the outer groove in the pulley 282. Since the bearing 287 is adjustable on the rod 178, the tension of the belt 283 can be regulated.

In summary, a film 20 of tubular plastic material is advanced with a substantially tensionless progression to a stationary position under the sealing head 91. When the film is thus positioned, a radially curved heat-applying element is lowered automatically to form a curved seal across the tubular film. While the film is still in weakened condition due ot the application of heat, the tensionless progression of the film is resumed and this tensionless condition is maintained until the film passes around the idler roller 110.

When the sealed portion of the tubular film reaches the knife assembly in the cutting section, the film is once more stopped and the lower cutting blade 232 is pivoted upwardly to cut the film immediately in front of the seal. The length of film forwardly of the cut is discharged from the machine by the roller assemblies 187 and 188.

From the foregoing description, it will be seen that, in this invention, there is provided a novel efficient mechanism for forming bags from tubular heat-sealable material without causing tearing, deformation, or stretching of the material. The novel mechanism for moving the tubular material through the heat-sealing section under substantially no tension permits the production of uniform, tightly sealed bags. Further, the application of the sealing shoe against the film while it is supported on a resilient belt backed by a rigid support plate provides a more perfect seal than has heretofore been found possible in such a machine.

It will be understood that modifications and variations may be effected without departing from the scope of the novel concepts of the present invention.

We claim:

1. A bag making machine comprising a first support structure, rods secured to said support structure and extending forwardly therefrom, a second support structure slidably adjustable on said rods, means for locking said second support structure in adjusted position, means for advancing a tubular film across both said support structures, means for applying a transverse seal to said tubular film while said film is carried by said first support structure, and means carried by said second support structure for making a transverse cut on said film adjacent said transverse seal.

2. In a bag making machine, a sealing station comprising a support structure, a pair of rollers journalled in spaced relation on said structure for rotation about parallel axes, a belt trained over said rollers, said belt having a lateral dimension sufficient to support an elongated tubular strip of heat sealable material, means for rotating one of said rollers to drive said belt and advance the tubular strip, means extending transversely of the belt for applying heat to a transverse section of the strip on said belt to form a seal transversely on said strip, and means for frictionally pressing the film against spaced longitudinal sections of said belt at points on either side of said seal to effect movement of said film between said points at the speed of said belt.

3. In a bag making machine, a bag sealing station comprising an endless rubber belt arranged to support a tubular film of heat sealable material thereon, a sealing head extending transversely with respect to the belt and movable into engagement with the film on said belt to apply a transverse seal thereto, a first roller disposed above said belt in advance of said sealing head, means for resiliently pressing said first roller against the film on said belt to frictionally engage the film between the roller and the belt and advance it toward a position under said sealing head, a second roller disposed above said rubber belt on the discharge side of said sealing head, means for resiliently pressing said second roller against the film on said belt to engage the film between said second roller and said belt to draw said film away from said sealing head, and means for driving said first roller, said second roller and said belt at the same linear speed.

4. In a bag making machine, a bag sealing station comprising a support structure, a pair of rollers journalled in spaced relation on said structure for rotation about parallel axes, a belt disposed around said rollers and arranged to be driven thereby, said belt having a lateral dimension sufficient to support an elongated tubular strip of heat sealable material, means for rotating one of said rollers to drive said belt and said other roller and advance the strip on said belt, a sealing head for applying heat to a transverse section of the strip disposed on said belt to form a transverse seal on said strip, means for elevating said belt at the point said head applies a heat seal to the the strip, a first friction roller disposed above said belt in advance of said heat applying means, a second friction roller disposed above said belt on the discharge side of said heat applying means, and gear means interconnecting said first friction roller with one of said pair of rollers and interconnecting said second friction roller with the other of said pair of rollers.

5. A bag making machine comprising means for intermittently advancing a strip of heat sealable material along a predetermined path, means for applying a curved heat seal to said strip during a stationary interval in the progression of the strip through the machine, cutting means for applying a transverse cut to the strip adjacent to the seal and of substantially the same curvature as the seal, said cutting means including a stationary blade disposed above the strip, a movable blade mounted for swinging upward movement from below said strip to sever the strip against the stationary blade, said blades being arranged so that the cutting action is initiated near both sides of the film and progresses inwardly to the center of the film, and spring means arranged to exert a force longitudinally of the machine against said movable blade to urge it toward said stationary blade during the cutting stroke.

6. In a bag making machine, a pair of spaced apart parallel brackets, said brackets having a first pair of opposed vertical slots adjacent the rearward end of said brackets and a second pair of vertical slots adjacent the forward end of said brackets, a drive roller having portions journalled for rotation in said brackets immediately below said first pair of slots, a driven roller having portions journalled for rotation in said brackets immediately below said second pair of vertical slots, an endless belt disposed around said drive roller and said driven roller, said belt being arranged to support and advance a tubular film of heat sealable material, a bearing block disposed for vertical sliding and adjusting movement in each slot, a first friction roller journalled for rotation in the bearing blocks in said first pair of opposed vertical slots, a second friction roller journalled for rotation in the bearing blocks in said second pair of vertical slots, resilient means pressing said sliding blocks downwardly in said slots to move said first and second friction rollers into frictional engagement with said belt, a sealing head mounted on said structure above said belt between said first and second friction rollers and arranged to be moved downwardly into sealing relation with the film on the belt to apply a seal thereto, and a support plate disposed between said brackets below the upper run of said endless belt and arranged to support the portion of said upper run directly under said sealing head at a slightly raised elevation relative to the remainder of said upper run.

7. In a bag making machine, a bag sealing station comprising a pair of spaced brackets, a drive roller rotatably journalled near adjacent ends in said spaced brackets, a pair of upstanding posts supported on the opposite ends of said brackets, a driven roller rotatably mounted in said posts, an endless belt disposed around said drive roller and said driven roller and arranged to advance a film of heat sealable material along a fixed path, means for adjusting said posts relative to said brackets to vary the tension on said belt, an idler roller disposed adjacent each end of the belt and arranged to urge the film into substantially 180° of frictional contact with each end of the belt, and a heated sealing head arranged for movement into sealing relation with film on said belt to apply a seal thereto.

8. In a bag making machine, a bag sealing station comprising a support structure, a rigid plate mounted in said structure and having an upper surface lying in a substantially horizontal plane, an endless belt of resilient material having an upper reach movable across the upper surface of said plate, said belt being arranged to support and advance a tubular film of heat sealable material, and a sealing head mounted for vertical movement toward and away from the film on said belt, said head having a bead curved on the arc of a circle and arranged to press said film against said resilient belt to form a seal having the configuration of said bead.

9. A bag making machine comprising an elongated support structure having opposite side edges, means for advancing a tubular film of heat sealable material along a fixed path longitudinally of said structure, a sealing shoe arranged to apply a curved seal to said film extending generally transversely of the path of movement of said film, said shoe being curved on the arc of a circle, which arc terminates adjacent the opposite side edges of said support structure beyond the marginal edges of said film, and a knife assembly for making a cut transversely of said film and adjacent said seal including cooperating blades having a curvature substantially the same as the curvature of said seal, said blades having end portions disposed beyond the marginal edges of said film and maintained in overlapping relation when said blades are in a position permitting movement of said film through said knife assembly by said film advancing means.

10. A bag making machine comprising a support structure, means for advancing a tubular strip of plastic material of fixed transverse dimension along said support structure, a sealing head mounted on said support structure and having a sealing shoe arranged to apply a curved seal to the tubular strip, said sealing shoe being curved on the arc of a circle and extending outwardly past the side marginal edges of said tubular strip, and a knife assembly mounted on said structure on the discharge side of said sealing head, said assembly including cooperating curved blades arranged to make a cut across said strip transversely thereof and closely adjacent to said seal, said blades being curved and formed on the arm of a circle of substantially the same radius as the radius of the circle defining the arc of the sealing shoe, the center of both circles being on substantially the same center-line longitudinally of the support structure.

References Cited in the file of this patent

UNITED STATES PATENTS

| | | |
|---|---|---|
| 2,326,931 | Dalton et al. | Aug. 17, 1943 |
| 2,444,685 | Waters | July 6, 1948 |
| 2,467,879 | Billeb | Apr. 19, 1949 |
| 2,660,219 | Haas et al. | Nov. 24, 1953 |
| 2,680,471 | Mercer | June 8, 1954 |

UNITED STATES PATENT OFFICE
CERTIFICATE OF CORRECTION

Patent No. 2,768,673                                                October 30, 1956

Rene J. Gaubert et al.

It is hereby certified that error appears in the printed specification of the above numbered patent requiring correction and that the said Letters Patent should read as corrected below.

Column 10, line 54, for "arm" read -- arc --.

Signed and sealed this 8th day of July 1958.

(SEAL)

Attest:
KARL H. AXLINE
Attesting Officer

ROBERT C. WATSON
Commissioner of Patents